(12) United States Patent
Lewis

(10) Patent No.: US 6,754,757 B1
(45) Date of Patent: Jun. 22, 2004

(54) FULL MESH INTERCONNECT BACKPLANE ARCHITECTURE

(75) Inventor: Keith Lewis, Petaluma, CA (US)

(73) Assignee: Turin Networks, Petaluma, CA (US)

(*) Notice: Subject to any disclaimer, the term of this patent is extended or adjusted under 35 U.S.C. 154(b) by 317 days.

(21) Appl. No.: 09/746,212

(22) Filed: Dec. 22, 2000

(51) Int. Cl.$^7$ .............................................. G06F 13/00
(52) U.S. Cl. ....................................... 710/301; 370/254
(58) Field of Search .............................. 710/305, 309, 710/310, 107, 301; 370/254, 386, 276, 282, 284, 357, 359, 360, 406

(56) References Cited

U.S. PATENT DOCUMENTS

| | | | |
|---|---|---|---|
| 4,054,939 A | | 10/1977 | Ammon |
| 5,751,710 A | * | 5/1998 | Crowther et al. ........... 370/423 |
| 6,032,209 A | | 2/2000 | Mros et al. |
| 6,078,503 A | | 6/2000 | Gallagher et al. |
| 6,078,963 A | * | 6/2000 | Civanlar et al. ............ 709/238 |
| 6,154,449 A | * | 11/2000 | Rhodes et al. .............. 370/254 |
| 6,462,594 B1 | * | 10/2002 | Robinson et al. ........... 327/159 |
| 6,611,526 B1 | * | 8/2003 | Chinnaswamy et al. .... 370/406 |

FOREIGN PATENT DOCUMENTS

EP 0844763 A2 5/1998

OTHER PUBLICATIONS

Prunty, C., et al., "Serial Backplanes Transport Designers to the Analog Zone," Electronic Design, Penton Publishing, Cleveland, OH, vol. 47, No. 19, Sep. 20, 1999, pp. 79–80, 82, 84 and 86.

* cited by examiner

*Primary Examiner*—Glenn A. Auve
(74) *Attorney, Agent, or Firm*—Blakely, Sokoloff, Taylor & Zafman LLP

(57) ABSTRACT

A network box is described. In one embodiment, the network box comprises multiple card slots. Each of the slots has multiple ports. The network box also includes a full mesh interconnect backplane coupling each of the cards slots to each other using point-to-point serial links. The network box includes at least one card inserted into one of the slots. This card has a controller to maintain information specifying a mapping of connections between each of the ports on each of the card slots in order to configure connections between the card ports of the plurality of card slots.

11 Claims, 5 Drawing Sheets

| FUSE AND ALARM PANEL | | | | | | | | | | | | | | | | | | | |
|---|---|---|---|---|---|---|---|---|---|---|---|---|---|---|---|---|---|---|---|
| FAN TRAY | | | | | | | | | | | | | | | | | | | |
| INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | INTERFACE SLOT | SHELF CONTROLLER A | SHELF CONTROLLER B |
| 1 | 2 | 3 | 4 | 5 | 6 | 7 | 8 | 9 | 10 | 11 | 12 | 13 | 14 | 15 | 16 | 17 | 18 | 19 | 20 |
| AIR INTAKE | | | | | | | | | | | | | | | | | | | |

FIG. 1

FULL MESH INTERCONNECT BACKPLANE ARCHITECTURE

FIELD OF THE INVENTION

The present invention relates to the field of telecommunications; more particularly, the present invention relates to backplanes that enable communication between cards in an enclosure such as a network box.

BACKGROUND OF THE INVENTION

In telecommunications, cabinets are used at the switching office. Each of these cabinets includes one or more rack mountable enclosures, or network boxes. These enclosures typically contain a number of slots into which cards, or blades, are inserted. The cards are often dedicated to providing a particular communication interface. For example, one card may provide an interface to send and receive SONET data streams, while another card may have an interface to send and receive TDM data streams.

Cards may communicate with each other. However, not all such communication is direct. For example, in order for some cards to communicate with each other, they must go through one or more intermediate cards. This clearly slows down communications. The card-to-card communications occurs over a backplane. Furthermore, the backplanes are often very large, which affects the speed of communications going over the backplane.

Another problem with prior art network boxes is that the slots are usually dedicated to specific types of cards. Therefore, a card of one type cannot be put in every slot. This is usually due to the backplane being configured with ports on certain cards having dedicated, fixed connection to certain card slots.

SUMMARY OF THE INVENTION

A network box is described. In one embodiment, the network box comprises multiple card slots. Each of the slots has multiple ports. The network box also includes a full mesh interconnect backplane coupling each of the cards slots to each other using point-to-point serial links. The network box includes at least one card inserted into one of the slots. This card has a controller to maintain information specifying a mapping of connections between each of the ports on each of the card slots in order to configure connections between the card ports of the plurality of card slots.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 1 illustrates one embodiment of a rack enclosure.

DETAILED DESCRIPTION OF THE PRESENT INVENTION

Figure 2:
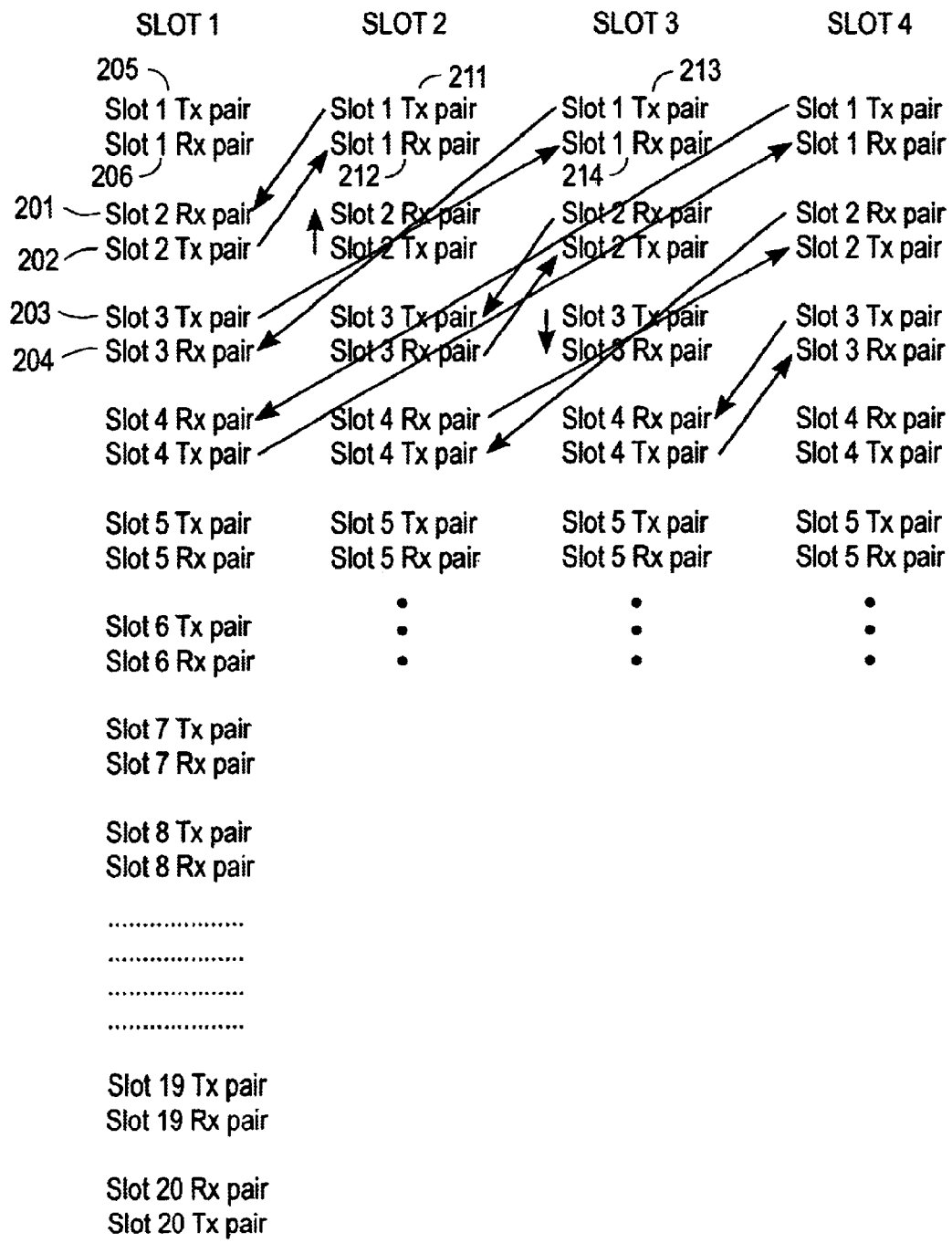
FIG. 2 is a conceptual view of the port-to-port connection in the mesh backplane.

A mesh interconnect backplane for use with a network box is described. In the following description, numerous details are set forth in order to provide a thorough understanding of the present invention. It will be apparent, however, to one skilled in the art, that the present invention may be practiced without these specific details. In other instances, well-known structures and devices are shown in block diagram form, rather than in detail, in order to avoid obscuring the present invention.

Overview

A network box is described. In one embodiment, the network box comprises multiple card slots. Each of the slots has multiple ports. The network box also includes a full mesh interconnect backplane coupling each of the cards slots to each other using point-to-point serial links. The network box includes at least one card inserted into one of the slots. This card has a controller coupled to maintain information specifying a mapping of connections between each of the ports on each of the card slots in order to configure connections between the card ports of the plurality of card slots.

The full mesh interconnect backplane allows direct connections between interface cards in the network box. In one embodiment, each interface (e.g., card) has a point-to-point connection to every other interface in the system. This enables a high aggregate bandwidth over the backplane and allows a distributed switch architecture.

Another benefit of the fully meshed topology is that every slot in the mesh is able to receive any card. That is, any interface card can be plugged into any slot and the card is able to determine the slot to which each card connector is attached. When a card is inserted in a particular slot, the card is able to dynamically configure its ports in order to interface to the backplane and connect with each of the other cards correctly. This is because the controller on the card provides the mapping information for the card. In one embodiment, the mapping information is loaded into and stored in a storage area, such as, for example, memory, a look up table, etc., on the card prior to the card being inserted into the slot. In another embodiment, the card is loaded with the mapping information of all card slots, and once the card is inserted into a slot, it is able to determine which slot it has been inserted into (via, e.g., one or more signals or information exchange) and based on that information, configure its ports to interface to the backplane correctly. Thus, each of the cards is configurable, and the configuration of the point-to-point connections are controlled via software on the card. This allows there to be no hardware dedicated to each slot. This is important because this allows the backplane to remain the same.

FIG. 1 illustrates one embodiment of a network box containing multiple slots. In one embodiment, sixteen of the slots contain network and user interface cards and four slots are used to contain control cards. In one embodiment, the network box also includes a fuse and alarm panel, fan tray and air intake locations. The fuse and alarm panel provides power distribution, fuses and alarm outputs and management and control of physical interfaces to shelves or systems.

The interface cards and the control card slots are interconnected to each other via the full duplex point-to-point mesh. In one embodiment, the dedicated point-to-point connections are serial links. In one embodiment, the serial links operate at 3.125 Gbps. In one embodiment, each of the links comprises a differential serial link. Therefore, each card has two links to another card in one direction and two links to the same card in the other direction.

FIG. 2 illustrates some exemplary transmit/receive pairs for each slot. Referring to FIG. 2, in slot 1, there is a connector for the slot 2 receive (Rx) pair 201 that is coupled to a connector for the slot 1 transmit (Tx) pair 211 for slot 2. Similarly, the connector for the slot 2 Tx pair 202 of slot 1 is coupled to a connector for the slot 1 Rx pair 212 for slot 2. Similarly, a connector for the slot 3 Tx pair 203 of slot 1 is coupled to a connector for the slot 1 Tx pair 213 of slot 3, and a slot 3 Rx pair 204 of slot 1 is coupled to a slot 1 Rx pair 214 of slot 3. Such connections continue until all dedicated connections are made between all of the slots. Note also that in one embodiment the connector for the slot 1 Tx pair 205 of slot 1 is coupled to the connector for the slot 1 Rx pair 206 to allow the slot 1 card to receive feedback via a feedback path. Each slot uses the same feedback mechanism. In an alternative embodiment, such feedback is not necessary.

Figure 3:
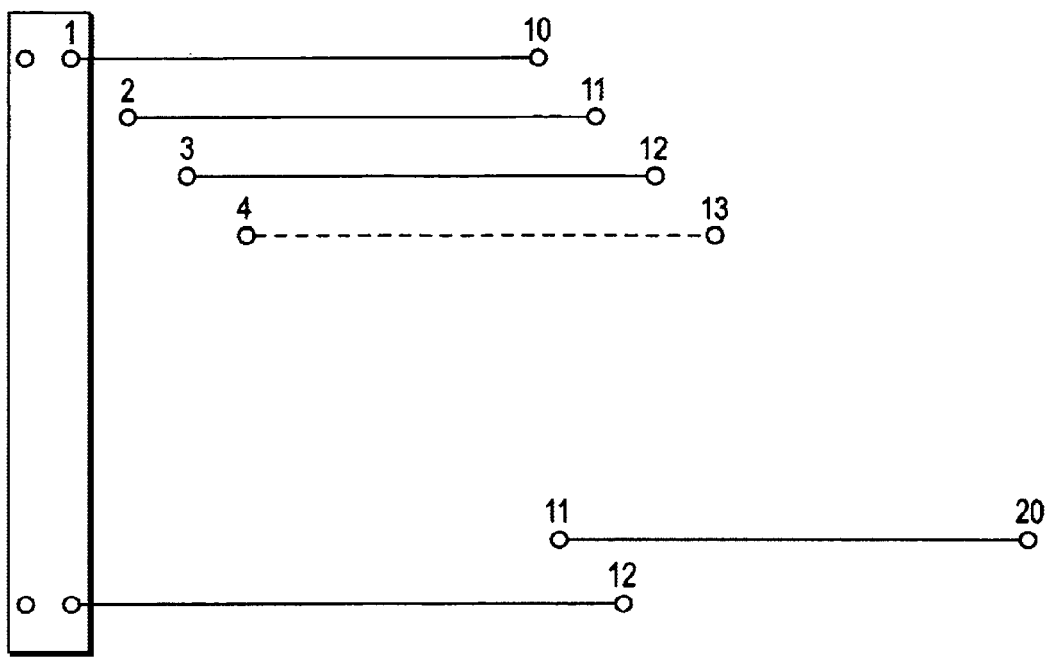
FIG. 3 illustrates one embodiment of the backplane having interleaved connections.

In one embodiment, the backplane comprises a multi-layered board in which the point to point connections are interleaved. FIG. 3 illustrates a portion of the interleaving that occurs on the backplane. Referring to FIG. 3, signals are layed out from the left connector of port 1 to the right connector of port 10, the left connector of port 2 to the right connector of slot 11 and so on. At slot 12, a left connection of slot 12 is connected to a right connection of slot 1. In one embodiment, the traces run horizontally and are arranged to avoid congestion. Furthermore, there are multiple horizontal channels into which the signals are run. For example, the signal from slot 1 to slot 10 along with the signal for slot 1 to slot 5, as well as other signals, may be in the same horizontal channel. In one embodiment, each of the channels having the same density or the same number of traces are in the same channel. By doing this, it helps reduce layer count and increase density while avoiding the effects of capacitive coupling.

In one embodiment, the backplane comprises an 18 layer FR4 board with port-to-port connections for 20 cards. Alternatively, the board may be made of a dielectric with a low dielectric constant. In one embodiment, the size of the backplane in a vertical dimension is approximately 4 inches to support an interconnect mesh for 20 interface cards.

Connectors

Figure 4A:
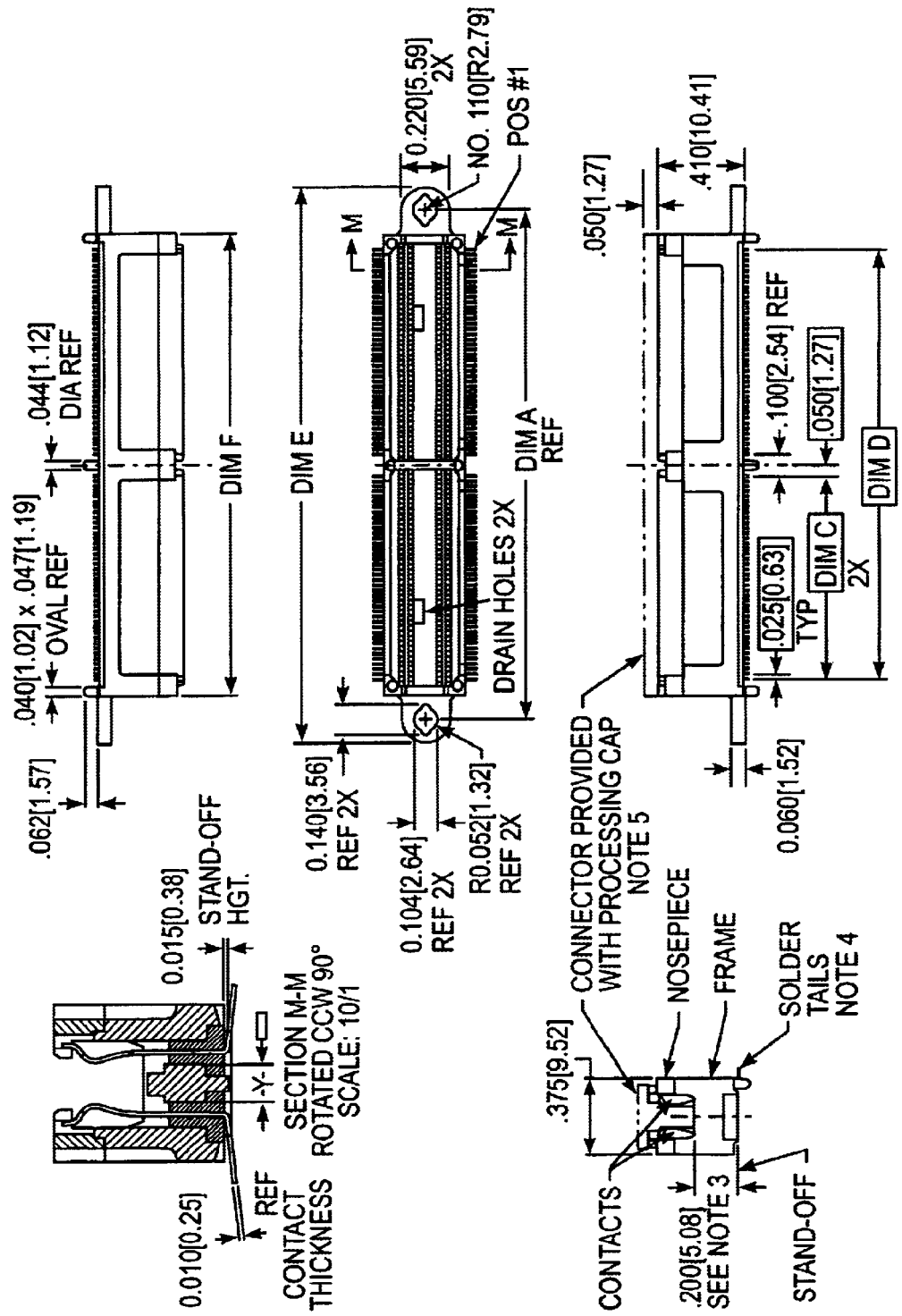
FIGS. 4A and 4B illustrate one embodiment of a connector.
Figure 4B:
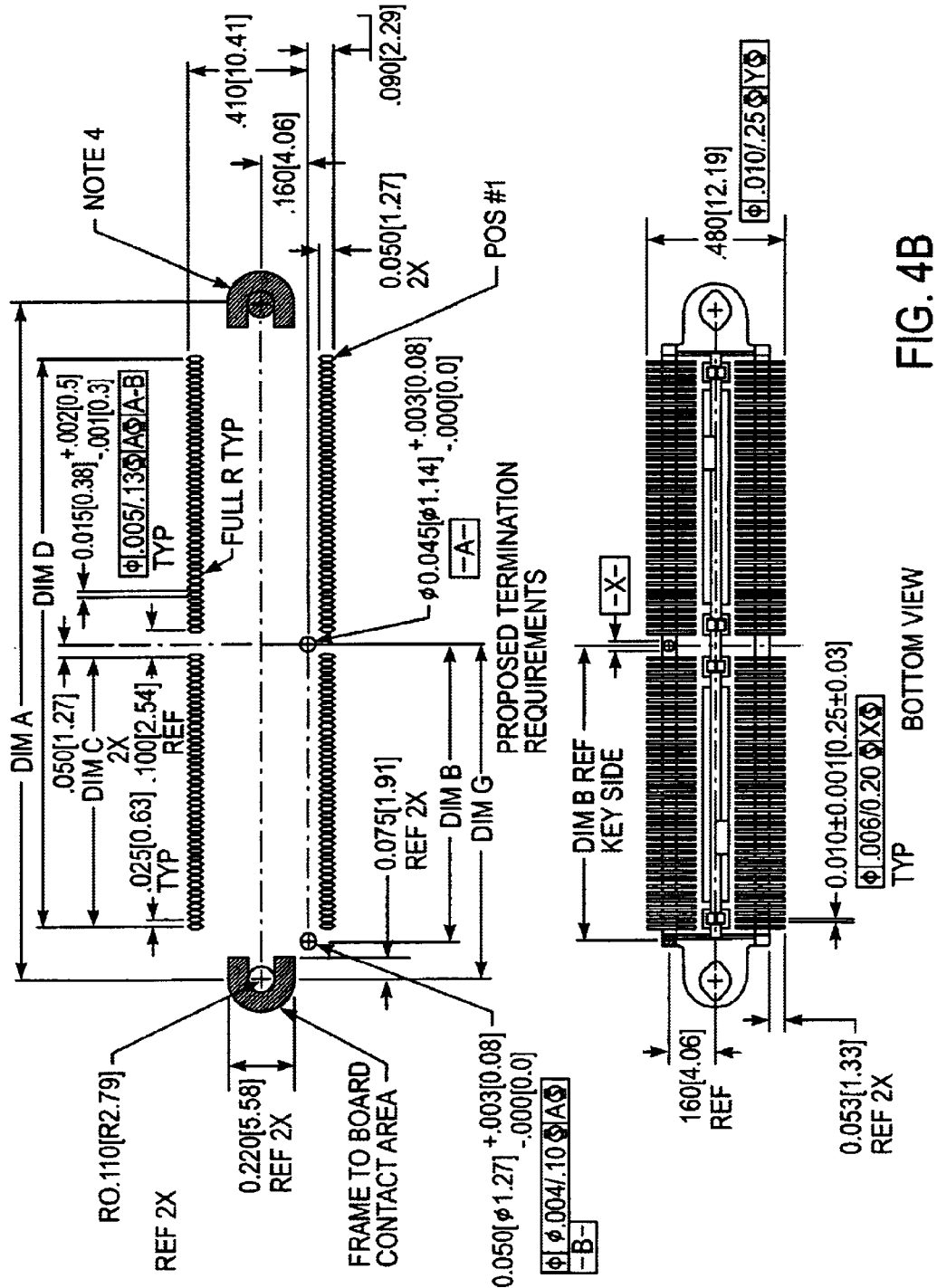

In one embodiment, in order to implement the mapping of the mesh dynamically, connectors are included within each slot. In one embodiment, the connectors are surface mount connectors. One embodiment of the connectors is described in FIGS. 4A and 4B, which would be understood by those skilled in the art.

Data Transferred Between Cards

The back plane interconnect architecture allows the distributed switch to be implemented with the mesh. The mesh does not preclude the use of a centralized switch fabric or other common data path card functions.

The back plane mesh also allows packet, cell or TDM data to flow from board to board in their native formats. In one embodiment, cell and packet data could share the same point-to-point data link. For more information see U.S. patent application Ser. No. 09/745,982, entitled "A Backplane Protocol," concurrently filed Dec. 22, 2000, assigned to the corporate assignee of the present invention and incorporated herein by reference.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

I claim:

1. A network box comprising:

a plurality of card slots, each of the plurality of slots having a plurality of ports;

a full mesh interconnect backplane coupling each of the plurality of card slots to each other using point-to-point serial links; and at least one card inserted into and coupled to one of the plurality of card slots, the card comprising a controller to maintain information specifying a mapping of connections between ports on the at least one card and ports on each of the plurality of card slots in order to configure connections between the card and ports of the plurality of card slots, wherein the card comprises a memory having a lookup table to store the mapping information.

2. The network box defined in claim 1 wherein the backplane comprises a multi-layered board in which the point-to-point serial links are interleaved.

3. The network box defined in claim 1 wherein the at least one card couples to the one card slot via a surface mount connector.

4. The network box defined in claim 1 wherein at least one of the point-to-point serial links operates at 3.125 Gbps.

5. A network box comprising:

a plurality of card slots, each of the plurality of slots having a plurality of ports;

a full mesh interconnect backplane coupling each of the plurality of card slots to each other using point-to-point serial links; and at least one card inserted into and coupled to one of the plurality of card slots, the card comprising a controller to maintain information specifying a mapping of connections between ports on the at least one card and ports on each of the plurality of card slots in order to configure connections between the card and ports of the plurality of card slots, wherein the point-to-point serial links comprise differential serial links and each of the plurality of card slots is coupled to other card slots in the plurality of card slots with one differential pair of serial links to send information and one differential pair of serial links to receive information to enable full duplex communication.

6. A network box comprising:

a plurality of card slots, each of the plurality of slots having a plurality of ports;

a full mesh interconnect backplane coupling each of the plurality of card slots to each other using point-to-point serial links, wherein the backplane comprises a multi-layered board in which the point-to-point serial links are interleaved; and a card inserted into one of the plurality of card slots, the card having a controller to maintain information specifying a mapping of connections between each of the ports on each of the plurality of card slots and to provide the card mapping information to indicate to the card which card slots are connected to each of the plurality of ports of the one card slot, the card being responsive to the mapping information to configure ports of the card to interface to the backplane to communicate with cards in other card slots, wherein the card comprises a memory having a lookup table to store the mapping information.

7. The network box defined in claim 6 wherein the card couples to the one card slot via a surface mount connector.

8. The network box defined in claim 6 wherein at least one of the point-to-point serial links operates at 3.125 Gbps.

9. A network box comprising:

a plurality of card slots, each of the plurality of slots having a plurality of ports;

a full mesh interconnect backplane coupling each of the plurality of card slots to each other using point-to-point serial links, wherein the backplane comprises a multi-layered board in which the point-to-point serial links are interleaved; and a card inserted into one of the plurality of card slots, the card having a controller to maintain information specifying a mapping of connections between each of the ports on each of the plurality of card slots and to provide the card mapping information to indicate to the card which card slots are connected to each of the plurality of ports of the one card slot, the card being responsive to the mapping information to configure ports of the card to interface to the backplane to communicate with cards in other card slots, wherein the point-to-point serial links comprise differential serial links and each of the plurality of card slots is coupled to other card slots in the plurality of card slots with one differential pair of serial links to send information and one differential pair of serial links to receive information to enable full duplex communication.

10. A method comprising:

interconnecting a plurality of card slots having a plurality of ports with each other using a full mesh interconnect backplane having point-to-point serial links running between the plurality of ports of the plurality of card slots;

providing mapping information to a card inserted into one of the plurality of card slots to specify connections of the backplane between each of the ports of the one card slot and each of the other card slots; and configuring ports on the card, based on the mapping information, to interface to the backplane to communicate with cards in other slots, wherein the card comprises a memory having a lookup table to store the mapping information.

11. A method comprising:

interconnecting a plurality of card slots having a plurality of ports with each other using a full mesh interconnect backplane having point-to-point serial links running between the plurality of ports of the plurality of card slots;

providing mapping information to a card inserted into one of the plurality of card slots to specify connections of the backplane between each of the ports of the one card slot and each of the other card slots; and configuring ports on the card, based on the mapping information, to interface to the backplane to communicate with cards in other slots, wherein the point-to-point serial links comprise differential serial links and each of the plurality of card slots is coupled to other card slots in the plurality of card slots with one differential pair of serial links to send information and one differential pair of serial links to receive information to enable full duplex communication.

* * * * *